(12) United States Patent
Russell et al.

(10) Patent No.: US 9,596,100 B2
(45) Date of Patent: Mar. 14, 2017

(54) SOFTSWITCH USAGE ANALYSIS

(75) Inventors: James N. Russell, Tulsa, OK (US); Bob E. Taylor, Owasso, OK (US); Paul Rape, Owasso, OK (US); John Wes Rupell, Cleveland, OK (US); Roy Curtis Shell, IV, Owasso, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 801 days.

(21) Appl. No.: 12/971,841

(22) Filed: Dec. 17, 2010

(65) Prior Publication Data

US 2012/0155456 A1 Jun. 21, 2012

(51) Int. Cl.
*H04L 12/66* (2006.01)
*H04W 4/14* (2009.01)
*G06K 9/00* (2006.01)
*H04L 29/06* (2006.01)
*H04M 7/00* (2006.01)

(52) U.S. Cl.
CPC .......... *H04L 12/66* (2013.01); *G06K 9/00597* (2013.01); *H04L 29/06027* (2013.01); *H04M 7/006* (2013.01); *H04W 4/14* (2013.01)

(58) Field of Classification Search
CPC .............. H04L 12/66; H04L 29/06027; G06K 9/00597; H04W 4/14; H04M 7/006
USPC ......................... 370/352, 401, 254
See application file for complete search history.

(56) References Cited

U.S. PATENT DOCUMENTS

| | | | |
|---|---|---|---|
| 7,568,045 B1* | 7/2009 | Agrawal ........................ 709/233 |
| 2002/0120765 A1* | 8/2002 | Boehmke ............. H04L 12/2602 709/231 |
| 2007/0002842 A1* | 1/2007 | Wung et al. ................... 370/352 |
| 2008/0260121 A1* | 10/2008 | Chin et al. .................. 379/93.07 |
| 2009/0129560 A1* | 5/2009 | Bowden ........... G06Q 10/06311 379/32.01 |

* cited by examiner

*Primary Examiner* — Khaled Kassim

(57) ABSTRACT

A first set of data is received from a media gateway, the first set of data including an identifier for a trunk and a point code associated with the trunk. A second set of data is received from the media gateway, the second set of data including the trunk identifier, an identifier for a link associated with the trunk identifier, and a utilization value associated with the link. In a computing device having a processor and a memory, a data record is generated from the first set of data and the second set of data, the data record including a utilization value associated with the point code.

19 Claims, 5 Drawing Sheets

Fig. 2a

| Gateway ID 201 | Trunk ID 205 | Point Code 210 | Status Code 215 |

| Gateway ID 201 | Trunk ID 205 | Shelf ID 225 | Slot ID 230 | Port ID 235 | Link ID 240 | State 245 | Mode 250 | Utilization 255 |

220

500 →

| Gateway | Enabled DS0 | Disabled DS0 | Equipped DS0 | DS0 Utilized% | Enabled DS1 | Disabled DS1 | Equipped DS1 | DS1 Utilized |
|---|---|---|---|---|---|---|---|---|
| gnichimg1 | 13,608 | 504 | 14,112 | 96.43% | 567 | 21 | 588 | 96.43% |
| gnichimg2 | 13,680 | 432 | 14,112 | 96.94% | 570 | 18 | 588 | 96.94% |
| gnichimg3 | 13,296 | 816 | 14,112 | 94.22% | 554 | 34 | 588 | 94.22% |
| gnichimg4 | 13,368 | 744 | 14,112 | 94.73% | 557 | 31 | 588 | 94.73% |
| gnichimg5 | 14,064 | 48 | 14,112 | 99.66% | 586 | 2 | 588 | 99.66% |
| gnichimg6 | 14,952 | 1,176 | 16,128 | 92.71% | 623 | 49 | 672 | 92.71% |
| gnichimg7 | 16,080 | 2,064 | 18,144 | 88.62% | 670 | 86 | 756 | 88.62% |

Fig. 5

| PC | Name | Desc | Trunk | DS0 | DS1 | Ena DS1 | Ena Ins DS1 | Dis DS1 | Dis Ins DS1 |
|---|---|---|---|---|---|---|---|---|---|
| 214-195-1 | KSCYMOECGT7 | DMS-100 | OMAHNELVGT1_6501 | 360 | 15 | 15 | 15 | 0 | 0 |
| 1-9-10 | CCO1 | DMS-250 | CHCGILCP01T_6176 | 672 | 28 | 28 | 28 | 0 | 0 |
| 204-140-8 | SFLEMIFXCM2 | DMS | SFLEMIFXCM2_5068 | 1125 | 47 | 47 | 47 | 0 | 0 |
| 1-131-218 | HCHLILMTCM1 | DMS | HCHLILMTCM2_5042 | 744 | 31 | 31 | 31 | 0 | 0 |
| 1-94-117 | FARGNDGVCM1 | 5ESS | FARGNDGVCM1_5024 | 192 | 8 | 8 | 8 | 0 | 0 |
| 1-9-23 | RVG1 | DMS-250 | RVDLIL0001T_6151 | 672 | 28 | 28 | 28 | 0 | 0 |
| 204-122-10 | CRDLIL131MD | DMS | CRDLIL13CM1_5046 | 192 | 8 | 8 | 8 | 0 | 0 |
| 1-177-160 | NWBLWICZCM8 | DMS-250C | NWBLWICZCM8_5030 | 288 | 12 | 12 | 12 | 0 | 0 |
| 1-177-160 | NWBLWICZCM8 | DMS-250C | NWBLWICZCM8_5031 | 360 | 15 | 15 | 15 | 0 | 0 |
| 2-41-3 | LSJG | DMS-250G | LSANCAVJ01T_6065 | 672 | 28 | 28 | 28 | 0 | 0 |
| 204-140-8 | SFLEMIFXCM2 | DMS | SFLEMIFXCM2_5055 | 1173 | 49 | 49 | 49 | 0 | 0 |
| 240-110-5 | MTZNILXVOLD | WECO 5ESS HOST | MTZNILXCDS2_795 | 24 | 1 | 1 | 1 | 0 | 0 |

Fig. 6

SOFTSWITCH USAGE ANALYSIS

BACKGROUND INFORMATION

A softswitch may be used for routing calls. As used herein, a "softswitch" is a collection of components used to digitally route telecommunications. For example, a media gateway may be used, in conjunction with a policy server, to determine a destination for an incoming call, and to route packets associated with the incoming call to an appropriate destination. The destination may be associated with a particular customer or user. The customer may be served by a set of one or more trunks, each trunks including one or more links, e.g., Trunk Level 1 (T-1) links. Unfortunately, mechanisms are presently lacking for evaluating the use of particular links with respect to a particular customer or user.

BRIEF DESCRIPTION OF THE DRAWINGS

FIG. 2a illustrates an exemplary record pertaining to usage of a particular trunk line connected to a media gateway.

FIG. 2b illustrates an exemplary record pertaining to usage of a particular network link.

FIG. 5 illustrates an exemplary aggregation of data according to identifiers for media gateways.

FIG. 6 illustrates an exemplary aggregation of data according to customer identifiers.

DETAILED DESCRIPTION OF PREFERRED EMBODIMENTS

Figure 1:
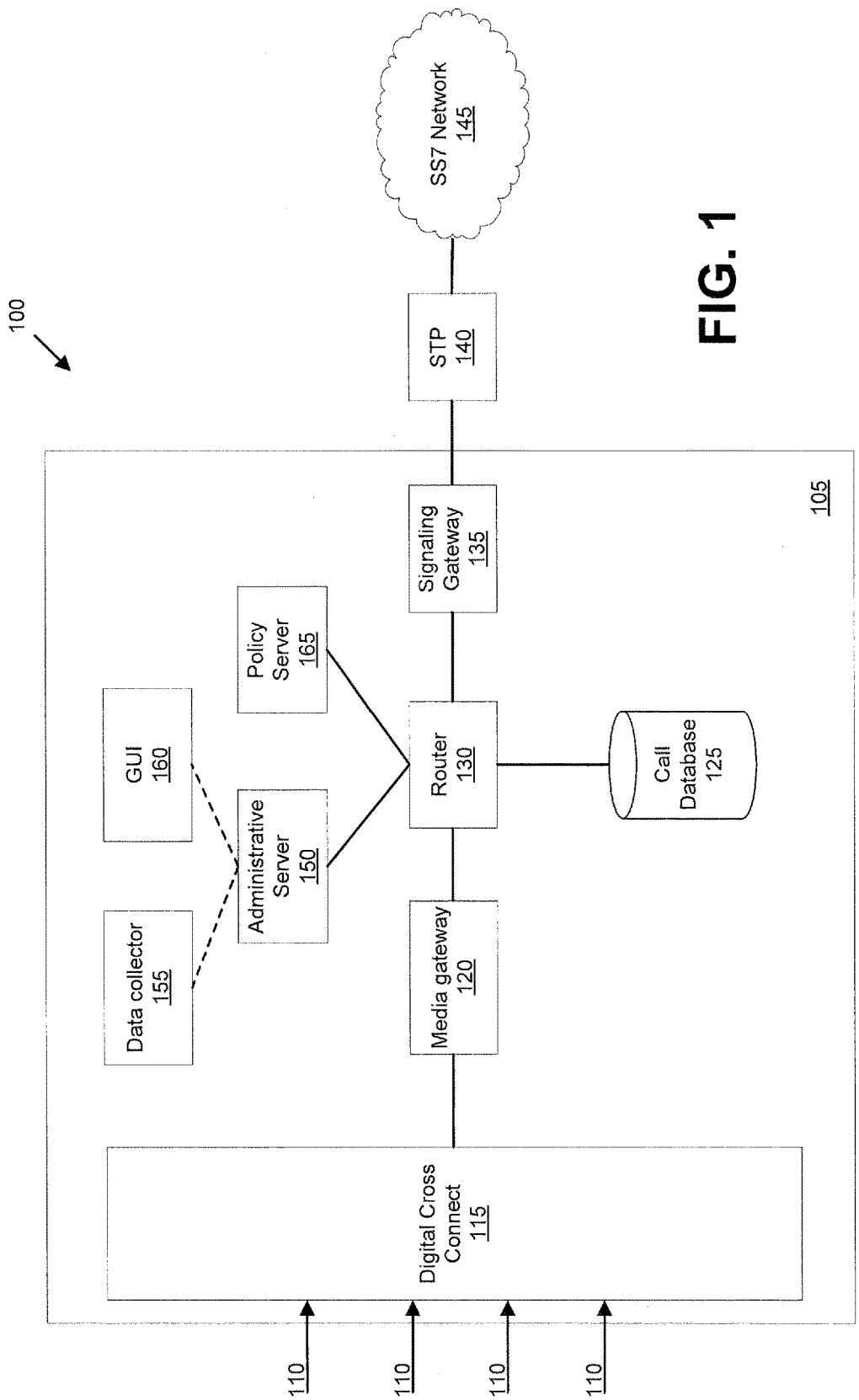
FIG. 1 illustrates an exemplary call processing system.

FIG. 1 illustrates an exemplary system 100 for processing calls that includes a call hub 105, e.g., a central office or the like for switching and routing telecommunications. Incoming calls 110 from telecommunication network carriers, e.g., from time division multiplex (TDM) networks, are received in the call hub 105 in a digital cross connect (DCC) 115. The call hub 105 includes at least one media gateway 120, and generally includes multiple media gateways 120, although only one media gateway 120 is illustrated and discussed herein for convenience. The media gateway 120 receives a TDM call 110 from DCC 115, and provides a stream of packets for the call 110 to be routed by a router 130 according to instructions provided to the media gateway 120 by a policy server 165. Records relating to calls 110 may be stored in a call database 125. A signaling gateway 135 receives signaling information for call setup from the router 130, serving as an interface between the call hub 105 and a signaling system 7 (SS7) network 145. A signal transfer point 140 sends and receives signaling information to and from the signaling gateway 135 and the network 145 for setup of calls 110.

DCC 115 is well known for providing lines that carry voice and data signals. As is known, lines are connected to ports in DCC 115, and DCC 115 allows users to digitally, rather than manually, connect lines by providing commands indicating which ingress and egress ports in DCC 115 are to be connected to one another.

Media gateway 120 generally includes what is generally referred to as a media gateway and media gateway controller. For example, in one implementation, media gateway 120 is the GSX9000 High-Density Media Gateway sold by Sonus Networks, Inc. of Westford, Mass. Media gateway 120 may receive TDM calls 110, and provide the calls 110 to router 130 according to Internet protocol (IP).

Database 125 is generally a relational database or the like for receiving and storing records related to calls 110. The database 125 generally includes instructions stored on a computer readable medium and executable by a computer processor for storing, processing, and providing records, e.g., in response to queries.

Router 130 provides internal and external routing functionality in a packet network. For example, in one implementation, the router 130 performs operations for both Open System Interconnect (OSI) Layers 2 and 3, thus operating as both an Ethernet switch and a network router.

The signaling gateway 135 allows the media gateway 120 to interface with the SS7 network 145. For example, in one implementation, signaling gateway 135 is the SGX4000 Universal Signaling Gateway sold by Sonus Networks, Inc. Signaling gateway 135 provides interfaces for signaling according to protocols associated with the SS7 network 145, including Integrated Services Digital Network User Part (ISUP) and Transactional Capabilities Application Part (TCAP). Thus, signaling gateway 135 terminates links from SS7 network 145, and converts ISUP messages to IP messages and accordingly provides IP links in the direction of router 130.

Signal transfer point (STP) 140 is a conventional signal transfer point for use in an SS7 network. Thus, STP 140 includes a packet switch for transferring messages between call hub 105, and nodes in the SS7 network 145.

Administrative server 150 may include instructions stored on computer readable media of one or more computing devices, and may be used for various operations in call hub 105. For example, the administrative server 150 may include a data collector 155, i.e., script, software application, etc., for gathering and analyzing information from media gateway 120, as discussed further below. Further, administrative server 150 may be configured to provide a graphical user interface (GUI) 160, such as a webpage or the like. Administrative server 150 may also, e.g., the a GUI 160 or some other interface, provide a mechanism for a user to query media gateway 120, and receive data from media gateway 120 concerning call transfer operations.

Policy server 165 provides policy and routing services for media gateway 120. For example, the policy server 165 includes a database of signaling addresses for routing calls 110, and may receive signaling information from the media gateway 120, and provide instructions to the media gateway 120 on how to establish a call 110.

FIG. 2a illustrates an exemplary record 200 pertaining to usage of a particular trunk line connected to media gateway 120. In particular, the record 200 associates the particular trunk line with a particular point code. Media gateway ID 201 is an identifier for a media gateway 120 from which the record 200 was obtained. Media gateway ID 201 is utilized in the illustration because call hub 105 generally includes multiple media gateways 120. Trunk ID 205 is an identifier for a trunk line connected to the media gateway 120. Point code 210 is a conventional point code as used in SS7 networks, and is used to identify a particular node or element, e.g., in SS7 network 145. As such, point code 210 may be used to identify a particular destination, e.g., a customer, associated with the trunk ID 205 included in the record 200 along with the point code 210. Status code 215 provides a status of the trunk identified by trunk ID 205, e.g., "available" or "out of service."

Fields 201, 205, 210, and 215 may all be stored on a computer readable medium included in media gateway 120, although media gateway ID 201 may be generated according to a media gateway 120 that was queried to obtain the record 200. Further, it is generally possible to query the media gateway 120 to obtain the record 200, possibly also along with other data.

FIG. 2b illustrates an exemplary record 220 pertaining to a usage of particular network link, e.g., a particular Trunk Level 1 (T-1) link. In particular, the record 220 associates a T-1 link with a particular trunk. Shelf ID 225, slot ID 230, and port ID 235 all identify particular locations in the media gateway 120. Shelf ID 225 identifies a particular shelf in the media gateway, slot ID 230 identifies a slot in the identified shelf, and port ID 235 identifies a particular port. Link ID 240 identifies a particular network link in the trunk identified by trunk ID 205. State 245 is an indicator of whether the identified link is available to be used, e.g., is enabled. Mode 250 is an indicator of whether the identified link is in service. State 245 and mode 250 provide information that may be used to alleviate network congestion, e.g., if a link is in service but not enabled, the link might be able to be used to relieve network congestion. Similarly, if a link is not in service but could be enabled, the link likewise might be able to be used to relieve network congestion. Utilization 255 provides a utilization for the link identified by the link ID 240, e.g., in terms of a percentage of capacity of the link being used.

Fields 201, 205, 225, 230, 235, 240, 245, 250, 255, etc. may all be stored on a computer readable medium included in media gateway 120, although media gateway ID 201 may be generated according to a media gateway 120 that was queried to obtain the record 200. Further, it is generally possible to query the media gateway 120 to obtain the record 220, possibly also along with other data.

Figure 3:
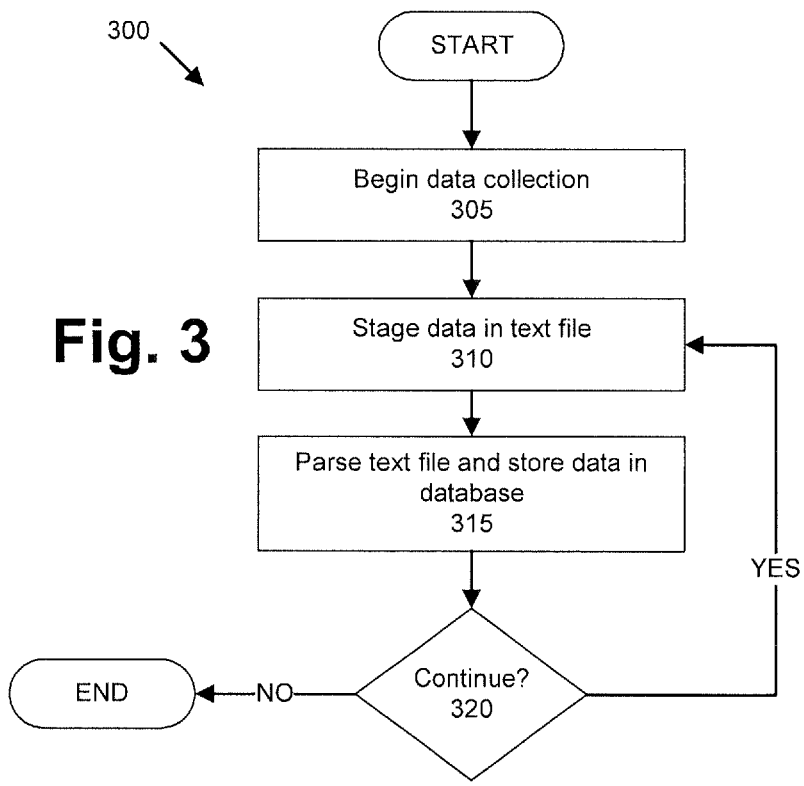
FIG. 3 illustrates an exemplary process for collecting data from a media gateway.

FIG. 3 illustrates an exemplary process 300 for collecting data from media gateway 120. For example, process 300 may be carried out according to instructions included in data collector 155. The process 300 begins in a step 305, when the data collector 155 initiates data collection. For example, the data collector 155 may include a script or the like that includes a query or queries to the media gateway 120 to obtain the data described with respect to records 200 and 220. In some implementations, the query may be configured to initiate a stream of data provided in response to the query. In other implementations, the query or queries may be provided to and responded to by media gateway 120 on a periodic basis. Note that records 200 and 220 generally must be obtained by separate queries because, apart from trunk ID 205, media gateway 120 is not configured to provide fields in the respective records 200 and 220 together.

Next, in step 310, data collector 155 receives the requested data, and stages it, e.g., in a text file or so-called flat file.

Next, in step 315, data collector 155 parses the data staged in step 310 and stores the parsed data in a data store, e.g., a computer readable medium accessible by or included in administrative server 150, database 125, or some other data store. Parsing the data staged in step 310 includes identifying different fields 205, 210, 215, 225, 230, 235, and 240.

Next, in step 320, data collector 155 determines whether data collections should continue. For example, data collector 155 may be configured to only collect data for a predetermined period of time, may have received input constructing it to seize data collections, etc. If data collection should continue, process 300 returns to step 310 to receive data from media gateway 120. Otherwise, process 300 ends.

Figure 4:
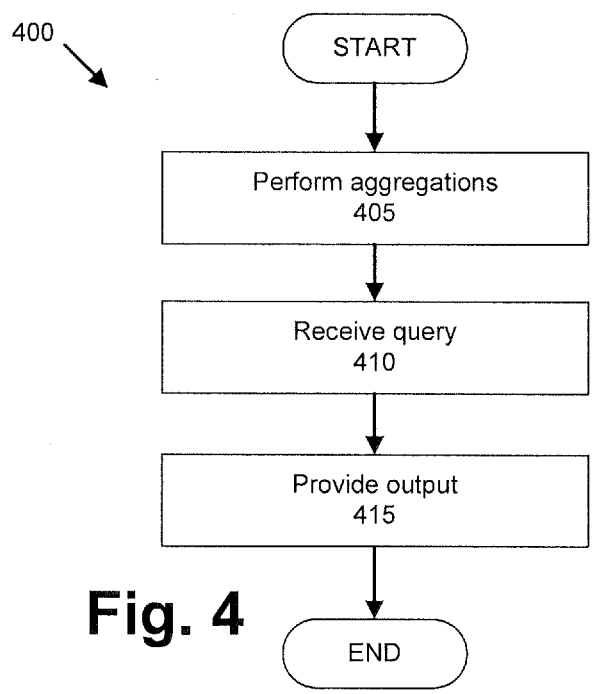
FIG. 4 illustrates an exemplary process for analyzing records collected from a media gateway.

FIG. 4 illustrates an exemplary process 400 for analyzing records 200 and 220 collected from media gateway 120. For example, process 400 may be carried out according to instructions included in server 150, including data collector 155. The process 400 begins in a step 405, in which records 200 and 220 are analyzed. For example, records 200 and 220 are generally joined to one another according to trunk ID 205, thereby allowing an association of a point code 210 with a link ID 240. This association allows various reports that would not otherwise be possible.

For example, the server 150 may include instructions to combine records 200 and 220 according to trunk ID 205, to provide an aggregate utilization number, using utilization 255, for each point code 210 found in records 200. Similarly, utilization 255 could be aggregated for point codes 210 known to be associated with a particular customer, group of network elements, etc. FIGS. 5 and 6, discussed below, include example of data that could be aggregated for a media gateway 120 and a customer, e.g., a point code, respectively.

Next, in step 410, server 150 receives a request for data analyzed as described above in step 405, e.g., from a user of GUI 160. For example, a user could request a report via a webpage or the like. Further, data could be provided to users via e-mail, text message, etc.

Next, in step 415, server 150 provides the data requested in step 410, e.g., displays a requested report on a webpage. FIGS. 5 and 6 provide examples of reports that could be displayed. Following step 415, process 400 ends.

FIG. 5 illustrates an exemplary data aggregation 500 in which data is aggregated according to a media gateway 120. Accordingly, reading from left to right, the first column shown in FIG. 5, labeled "Gateway," includes an identifier for a media gateway 120 in each row.

The second column, labeled "Enabled DS0," includes a number of Digital Signal level 0 channels that are enabled for the identified media gateway 120.

The third column, labeled "Disabled DS0," includes a number of Digital Signal level 0 channels that are disabled for the identified media gateway 120.

The fourth column shown in the aggregation 500, labeled "Equipped DS0," includes a number of Digital Signal level 0 channels with which the media gateway 120 is equipped. This fourth column generally includes a number in each row that is a sum of the numbers in the second and third columns in the row.

The fifth column, labeled "DS0 Utilized %" provides a percentage of DS0s with which the media gateway 120 is equipped that are utilized. That is, the fifth column may be derived by dividing the number in the second column by the number in the fourth column, i.e., Enabled DS0 divided by Equipped DS0.

The sixth through ninth columns shown in the aggregation 500 provide information with respect to Digital Signal level 1 channels associated with the media gateway 120, corresponding respectively to the information provided with respect to Digital Signal level 0 channels discussed above with respect to the second through fifth columns shown in FIG. 5. Note that DS1 links are sometimes also referred to as T-1 links.

In sum, the aggregation of data showing FIG. 5 allows for utilization of channels used by a particular media gateway 120 to be reported. That is, channel or link utilization may be aggregated by gateway 120.

FIG. 6 illustrates an exemplary data aggregation 600 in which data is aggregated according to a customer identifier, e.g., a point code (PC), as shown in the first column of the aggregation 600, and further according to a trunk serving that customer. The aggregation 600 generally applies to a particular media gateway 120, and may be a result of drilling into a particular media gateway 120 listed in the aggregation 500.

The second column provides a name of a network node to which the point code is connected.

The third column describes a type of the node. For example, "DMS" indicates Nortel DMS switches, "5ESS" indicates a Lucent 5ESS switching system, etc.

The fourth column includes an identifier for a trunk connected to the node.

The fifth column includes a number of Digital Signal level 0 channels being used by the node, i.e., by the customer identified by the PC.

The sixth column includes a number of Digital Signal level 1 channels, i.e., referred to as either DS1 or T-1 links, being used by the node, i.e., by the customer identified by the PC.

The seventh and eighth columns of the aggregation 600 respectively provide numbers for enabled trunks and enabled DS1 links to the customer associated with the PC and named node.

The ninth and tenth columns of the aggregation 600 respectively provide numbers for disabled trunks and disabled DS1 links to the customer associated with the PC and named node.

In practice, the aggregation 600 might not include all of the columns discussed above. Further, additional columns are possible. For example, although not shown, additional columns that could be included in the aggregation 600 include a utilization percentage for a PC, e.g., a customer, media gateway 120, and/or trunk. Further, a negotiated traffic type associated with a trunk could be included. The utilization percentage, for example, could compare a number of DS1 links available to the PC and/or node with a number of links available in the relevant media gateway 120. For example, from the aggregation 500 we might know that the relevant media gateway is equipped with 588 T-1 links. Accordingly, for the first PC listed in aggregation 600, it is possible to calculate a utilization of 2.55%, i.e., the PC is connected to 15 enabled T-1 links, which constitutes 2.55% of the T-1 links enabled in the media gateway 120.

The negotiated traffic type could be an identifier or indicator for a type of traffic that the customer associated with the PC and/or node had contracted to be carried over the trunk. For example, a customer may have contracted for transport of voice data, machine data, or some other kind of service over the trunk. Accordingly, the negotiated traffic type could further be compared to call detail records for the customer to determine if a customer was using more or different service than had been contracted for. That is, the negotiated traffic type could further be compared to call detail records to determine if customer's actual traffic usage adheres to their negotiated usage.

The aggregation 600 could also provide a user with opportunities to drill into the data presented. For example, if the aggregation 600 included a negotiated traffic type column, as discussed in the preceding paragraph, a user could be provided with the opportunity to drill down on this column, and thereby be presented with data relating to each of a plurality of negotiated traffic types associated with the customer. Further for example, a user could drill into aggregation 600 to see information about various types of signaling, e.g., SS7, voice over Internet protocol (VoIP), etc., used by various T-1 links included in a trunk.

Although as shown, aggregations 500 and 600 pertaining to a single date, it is to be understood that providing aggregations 500 and 600, and other aggregations, over a range of dates, or over a time period within a particular date, is also possible. Thus, aggregations 500 and 600, and other aggregations, may be used to provide a current or near-current snapshot of data pertaining to gateways 120, point codes, etc., or may be used to show longer term metrics relating to customers, gateways 120, gateway 120 ports, links, etc., such as historical usage, trends, etc.

Computing devices such as those disclosed herein may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving a first set of data from a media gateway, the first set of data including an identifier for a trunk and a point code identifying an out-of-band signaling network device associated with the trunk, wherein the trunk, the point code, and the out-of-band signaling network device are associated with at least one signaling system 7 (SS7) network, and wherein the at least one SS7 network comprises at least one signaling channel configured to convey signaling traffic to manage customer communication along the trunk:
   receiving a second set of data from the media gateway, the second set of data including the trunk identifier, an identifier for a link associated with the trunk identifier, and a utilization value associated with the link, wherein the utilization value associated with the link indicates a portion of capacity of the link being used, and wherein the link comprises the at least one signaling channel:
   generating, in a computing device having a processor and a memory, a data record from the first set of data and the second set of data, the data record including a utilization value associated with the point code; and
   generating a data record from the first set of data and the second set of data that includes a utilization value associated with the media gateway, wherein the utilization value associated with the media gateway corresponds to a percentage of links enabled in the media gateway.

2. The method of claim 1, further comprising identifying the point code as associated with a customer, and generating the data record to provide the utilization value associated with the customer.

3. The method of claim 1, the second set of data further including at least one of an indicator of a state of the link and a mode of the link.

4. The method of claim 1, further comprising generating a data record from the first set of data and the second set of data that includes an aggregate utilization value associated with the point code and at least one additional point code.

5. The method of claim 1, further comprising generating a data record from the first set of data and the second set of data that includes a negotiated traffic type associated with the point code.

6. The method of claim 1, further comprising generating a plurality of data records from the first set of data and the second set of data, each of the data records including data for a negotiated traffic type associated with the point code.

7. A non-transitory computer-readable medium storing instructions executable by a processor to:
   receive a first set of data from a media gateway, the first set of data including an identifier for a trunk and a point code identifying an out-of-band signaling network device associated with the trunk, wherein the trunk, the point code, and the out-of-band signaling network device are associated with at least one signaling system 7 (SS7) network, and wherein the at least one SS7 network comprises the trunk configured to convey customer communication traffic and at least one signaling channel distinct from the trunk:
   receive a second set of data from the media gateway, the second set of data including the trunk identifier, an identifier for a link associated with the trunk identifier, and a utilization value associated with the link, wherein the utilization value associated with the link indicates a portion of capacity of the link being used, and wherein the at least one signaling channel is the link:
   generate a data record from the first set of data and the second set of data, the data record including a utilization value associated with the point code; and generate a data record from the first set of data and the second set of data that includes a utilization value associated with the media gateway, wherein the utilization value associated with the media gateway corresponds to a percentage of links enabled in the media gateway.

8. The medium of claim 7, further comprising instructions to identify the point code as associated with a customer, and generate the data record to provide the utilization value associated with the customer.

9. The medium of claim 7, the second set of data further including at least one of an indicator of a state of the link and a mode of the link.

10. The medium of claim 7, the instructions further executable by the processor to generate a data record from the first set of data and the second set of data that includes an aggregate utilization value associated with the point code and at least one additional point code.

11. The medium of claim 7, the instructions further executable by the processor to generate a data record from the first set of data and the second set of data that includes a negotiated traffic type associated with the point code.

12. The medium of claim 7, the instructions further executable by the processor to generate a plurality of data records from the first set of data and the second set of data, each of the data records including data for a negotiated traffic type associated with the point code.

13. A system, comprising a computer device that includes a processor and a memory, the computer device configured to:
   receive a first set of data from a media gateway, the first set of data including an identifier for a trunk and a point code identifying an out-of-band signaling network device associated with the trunk, wherein the trunk, the point code, and the out-of-band signaling network device are associated with at least one signaling system 7 (SS7) network, and wherein the at least one SS7 network comprises the trunk configured to convey customer communication traffic and at least one signaling channel to manage customer communication traffic along the trunk:

receive a second set of data from the media gateway, the second set of data including the trunk identifier, an identifier for a link associated with the trunk identifier, and a utilization value associated with the link, wherein the utilization value associated with the link indicates a portion of capacity of the link being used, and wherein the link comprises the at least one signaling channel: and generate a data record from the first set of data and the second set of data, the data record including a utilization value associated with the point code; and generate a data record from the first set of data and the second set of data that includes a utilization value associated with the media gateway, wherein the utilization value associated with the media gateway corresponds to a percentage of links enabled in the media gateway.

14. The system of claim 13, the computer device further configured to identify the point code as associated with a customer, and generate the data record to provide the utilization value associated with the customer.

15. The system of claim 13, the second set of data further including at least one of an indicator of a state of the link and a mode of the link.

16. The system of claim 13, the computer device further configured to generate a data record from the first set of data and the second set of data that includes an aggregate utilization value associated with the point code and at least one additional point code.

17. The system of claim 13, the computer device further configured to generate a data record from the first set of data and the second set of data that includes a negotiated traffic type associated with the point code.

18. The system of claim 13, the computer device further configured to generate a plurality of data records from the first set of data and the second set of data, each of the data records including data for a negotiated traffic type associated with the point code.

19. The method of claim 1, the utilization value associated with the point code indicating an aggregate utilized portion of the links available to the point code.

* * * * *